Aug. 18, 1964  K. H. PALSSON  3,144,839
LADING SEPARATOR FOR RAILWAY CARS AND OTHER VEHICLES
Filed Aug. 14, 1962  6 Sheets-Sheet 1

INVENTOR
KRISTJAN H. PALSSON
BY
ATTORNEY

Aug. 18, 1964 K. H. PALSSON 3,144,839
LADING SEPARATOR FOR RAILWAY CARS AND OTHER VEHICLES
Filed Aug. 14, 1962 6 Sheets-Sheet 2

INVENTOR
KRISTJAN H. PALSSON
BY
ATTORNEY

Aug. 18, 1964  K. H. PALSSON  3,144,839
LADING SEPARATOR FOR RAILWAY CARS AND OTHER VEHICLES
Filed Aug. 14, 1962  6 Sheets-Sheet 3

INVENTOR
KRISTJAN H. PALSSON
BY
ATTORNEY

Aug. 18, 1964 K. H. PALSSON 3,144,839
LADING SEPARATOR FOR RAILWAY CARS AND OTHER VEHICLES
Filed Aug. 14, 1962 6 Sheets-Sheet 4

INVENTOR
KRISTJAN H. PALSSON
BY
ATTORNEY

Aug. 18, 1964　　　K. H. PALSSON　　　3,144,839
LADING SEPARATOR FOR RAILWAY CARS AND OTHER VEHICLES
Filed Aug. 14, 1962　　　　　　　　　　　　　6 Sheets-Sheet 5

INVENTOR
KRISTJAN H. PALSSON
BY (signature)
ATTORNEY

Aug. 18, 1964        K. H. PALSSON        3,144,839
LADING SEPARATOR FOR RAILWAY CARS AND OTHER VEHICLES
Filed Aug. 14, 1962                6 Sheets-Sheet 6

INVENTOR
KRISTJAN H. PALSSON
BY Ralph L. Bassett
ATTORNEY

United States Patent Office 3,144,839
Patented Aug. 18, 1964

3,144,839
LADING SEPARATOR FOR RAILWAY CARS AND OTHER VEHICLES
Kristjan H. Palsson, Seattle, Wash., assignor to Pacific Car and Foundry Company, Renton, Wash.
Filed Aug. 14, 1962, Ser. No. 216,775
20 Claims. (Cl. 105—376)

This invention relates to load dividers, particularly for use in railway cars and similar vehicles, and comprehends the use of a single separator or a plurality of separators capable of traversing the length of the car on suitably arranged tracks and movable from a position transverse of the car for separating the lading to a position generally longitudinally of the car or parallel to the side walls of the car and adjacent thereto for parking.

In the prior art relating to this subject, the embodiments have not wholly produced the desired results because the mechanism failed in certain important characteristics such, for instance, as inappropriate load supporting mechanism for the separators to distribute the load equally on its hanger wheels when the separator is either in its side or parked or load dividing position; inability to adjust the separator tightly against the lading in the car; the tendency of the separator supporting carriage to become dislodged from its trackage; the unnecessary wear of the separator supporting hanger on its trackage or trolley beam; and the inability to adjust the separators with respect to the vertical height of the inner dimensions of the car, which, as is well known in the art, is by no means consistent.

One of the objects of the present invention is to provide a novel association between the arrangement and structure of the transverse traveling cranes or beams and the longitudinal side tracks to facilitate the closer positioning of the separators against the side walls of the car by a new and novel type of door hanger.

A further object of this invention is to provide a novel form of hanger for supporting the separator on its transverse beam or crane to accomplish the proper locating of the separator against the side wall of the car without injury or unnecessary wear on the transverse beam or crane.

Another object of the invention is to provide a transverse beam or crane which is capable of distributing the load equally on its trolley wheels when the separator is in its side or parked position.

Another object of this invention is to provide a locking and supporting mechanism which will enable the tight positioning of the separator against the lading in a compartment so that this lading will be held against unnecessary slippage occurring from buff and draft conditions during transportation.

A primary object of the invention is the concept of extending the ends of the crane or beam over the side rail and to a position between the side rail and car side, whereby the use of a balanced C-shaped hanger aligned with the beam or crane will operate to position the separator directly against the car side.

A further object of this invention is to provide means for correcting the door elevation to accommodate for the variations in height between the floor of the car and the beam or crane, this height structure difference occurring in the building of the conventional lading container bodies, such as railway cars.

A further object of the invention is the provision of fabricated separator structures capable of withstanding load impact and which separator structures are of relatively light weight and manufactured of generally commercially available associated parts.

These and other objects of the invention will more clearly hereinafter appear by reference to the accompanying drawings forming a part of the instant specification and wherein like characters of reference designate corresponding parts throughout the several views, in which.

Figure 1:
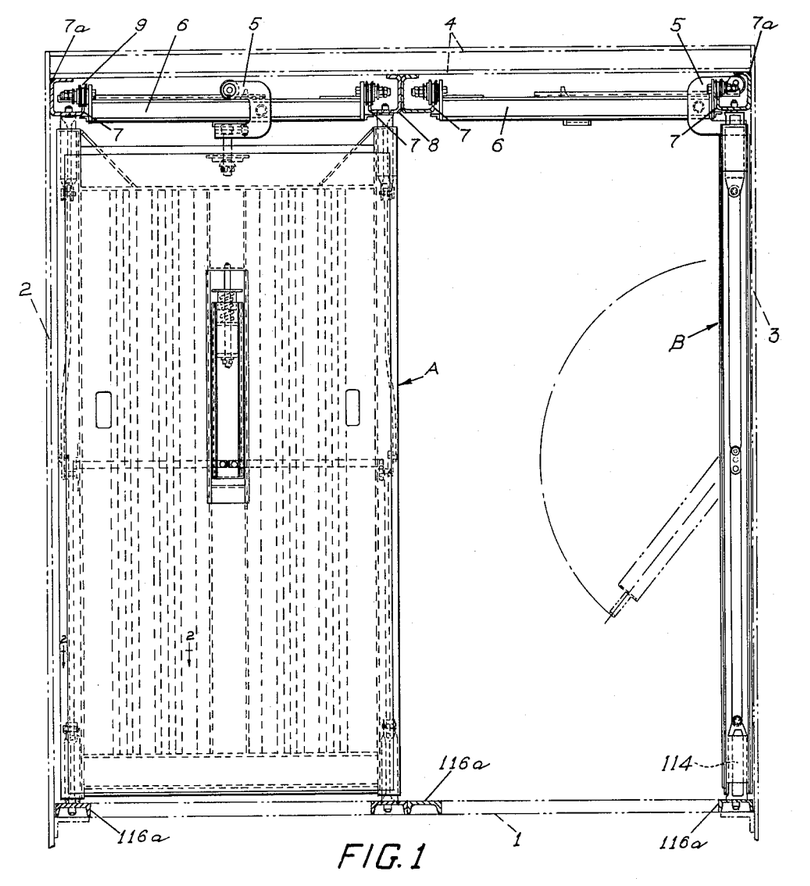
FIG. 1 shows a transverse section through a railway car illustrating in front elevation an arrangement of dual separators embodying the invention.

In the disclosure of FIG. 1 a railway car is outlined to include a floor 1, walls 2 and 3, and a ceiling structure 4. The disclosure of FIG. 1 comprehends the use of a pair of separators or load braces. The separator or load brace A is shown positioned transversely of the car in load separating or load bracing position and the separator or load brace B is shown in parked position against the side wall 3 of the railway car. Each of the car separators or load braces A and B is mounted on a traveling hanger 5, shown more in detail in FIGS. 5, 6, 7, 9 and 10. The traveling hangers 5 are mounted on the cross beam or crane structures 6, the latter being supported on the track 7 of side rail 7a and the center rail 8, by means of carriages 9, shown more fully in FIGS. 3 and 4.

Figure 5:
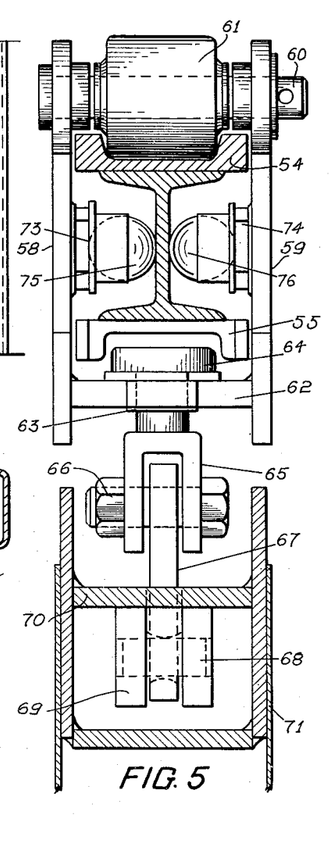
FIG. 5 is a transverse section on line 5—5 of FIG. 4.

Referring now to the hanger structure of FIG. 5, it will be noted that this separator hanger structure is fabricated to position the load of the separator directly beneath the trackway and directly beneath the supporting roller so that the load is not offset from the trackway but is directly depending from the mounting roller of the hanger and immediately beneath the trackway, which is contrary to the general practice in the prior art where the weight of the separator and the forces applied to the separator are at an angle to the suspension which tends to result in unsatisfactory operation and failure of the parts.

Figure 6:
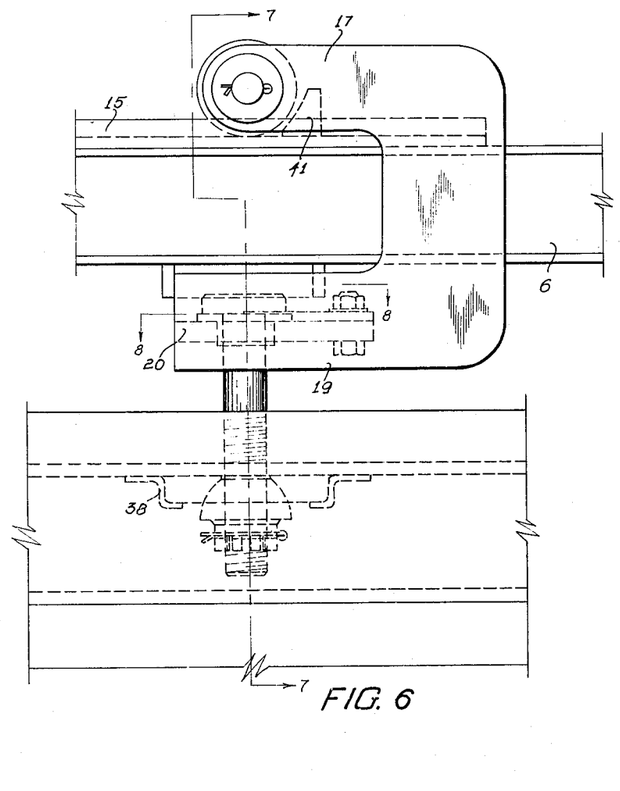
FIG. 6 is a side elevation of another form of traveling door hanger.
Figure 7:
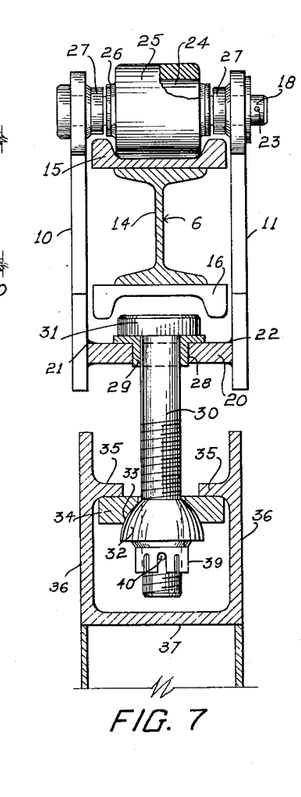
FIG. 7 is a view, partly in section, on line 7—7 of FIG. 6.
Figure 8:
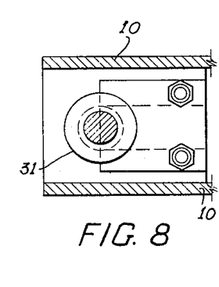
FIG. 8 is a fragmentary section on line 8—8 of FIG. 6.

In the disclosure of FIGS. 6 and 7, the roller hanger for the separator comprises a pair of spaced plates 10 and 11, the plates being spaced apart laterally at each side of the transverse beam or crane 6. The transverse beam or crane 6 includes an I-beam 14, top rail 15 and bottom spacer section 16. The top rail 15 is formed with a longitudinal, upwardly facing groove for the reception and travel of the mounting roller. The plates 10 and 11, as shown in FIG. 6, are of C-shape with the upper extremities of the legs 17 connected by the roller mounting pin 18 and the bottom legs 19 connected by a transverse plate 20 welded to the inner faces of the plates 10 and 11, as shown at 21 and 22. The roller pin 18 is so positioned with respect to the transverse plate 20 that these parts are positioned, respectively, above and below the beam or crane 6, as is clearly shown in FIG. 7. It will also be noted that the transverse connecting plate 20 connecting the C-shaped plates 10 and 11 below the trackway 6 traverses an area immediately below the roller pin 18, whereby the separator mounting, to be hereinafter described, is suspended directly below the roller mounting pin 18 to correctly position the load.

The roller mounting pin 18 extends through aligned openings in the outer extremities of the upper legs 17, as is clearly shown, and a removable pin fastener or other means may hold the same in position. The pin 18 is provided with a bushing 24 upon which the roller 25 is mounted. Thrust washers 26 are arranged between the head of the roller and the aligned tubing members or extensions 27 projecting from each side of the inner faces of the free ends of the legs 17. The extensions 27 may be steel tube sections welded about the aligned openings in the ends of the legs 17 of the plates 10 and 11, as shown. This assembly provides a removable mounting for the roller and facilitates and provides for lubrication of the elements included in the assembly. Also it will be obvious that by removal of the roller mounting pin 18, the roller assembly can be removed to permit the positioning or reversal of the hanger parts on the transverse beam or crane 6.

The transverse plate 20 connecting and reinforcing the bottom legs 19 of the C-shaped plates 10 and 11 is formed with a vertical annular opening 28, the axis of which is aligned with a vertical plane extending through the transverse axis of the pin 18 and a bushing 29 is positioned in this opening to receive a depending pin 30 having a head 31 mounted on the top flange of bushing 29. The depending pin 30 is threaded at its lower end, as shown, and receives an internally threaded nut 39 formed with an arcuate upper face 32 for seating in an arcuate socket 33 of a plate 34 fixed between flanges 35 projecting inwardly from the side walls 36 of the upturned channel 37 forming the top frame member of a separator assembly. Angle pieces 38 may be welded to the channel member 37 to support the plate 34, as shown in FIG. 6. Suitable lock means, such as pin 40, may be used to secure the nut 39 in properly adjusted position and in this manner the vertical position of the separator or door section may be regulated so that it will properly clear the floor of the vehicle in which it is mounted. The upper channel 15 forming the trackway for the roller 25 may terminate short of the full length of the transverse beam or crane 6 as the separator hanger travel will be limited and the determination of this travel may be regulated by an arcuate block, such as is shown in dotted lines at 41 in FIG. 6.

Figure 3:
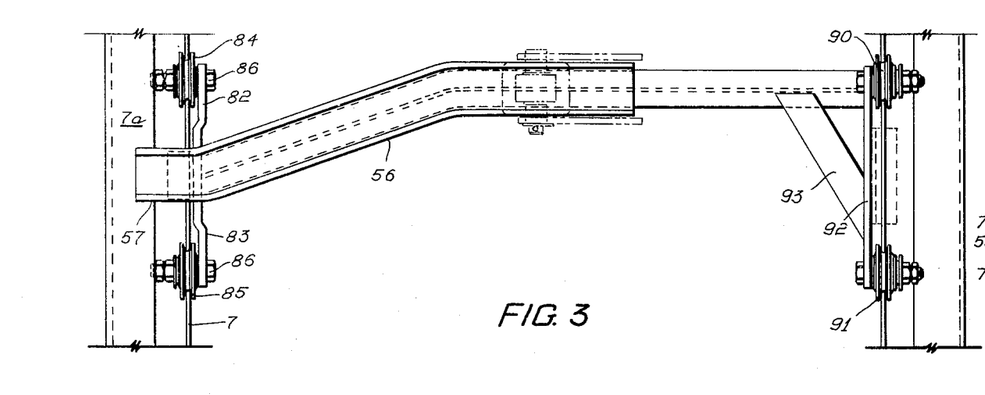
FIG. 3 is a top plan view of one form of traveling crane or beam.

In FIG. 3 there is disclosed a curved transverse beam or crane assembly, the structure of which tends to distribute the load equally on the trolley wheels when the door is in its side or parked position. The configuration of this curved track is best illustrated in the top plan view of FIG. 3 and in this figure and in FIG. 4 it will be seen that the track is of the same general structure as in the track assembly of FIG. 6 and embodies an upright I-beam 51 having upper and lower flanges 52 and 53, top rail 54 and the lower channel brace 55. In this form of the invention the track assembly has an end portion 56 angled towards the adjacent side wall of the car. Its terminal portion 57 may optionally be bent as shown to be generally parallel to its main body structure and at right angles to the side rail 7 upon which one of the trolleys travels.

Figure 4:
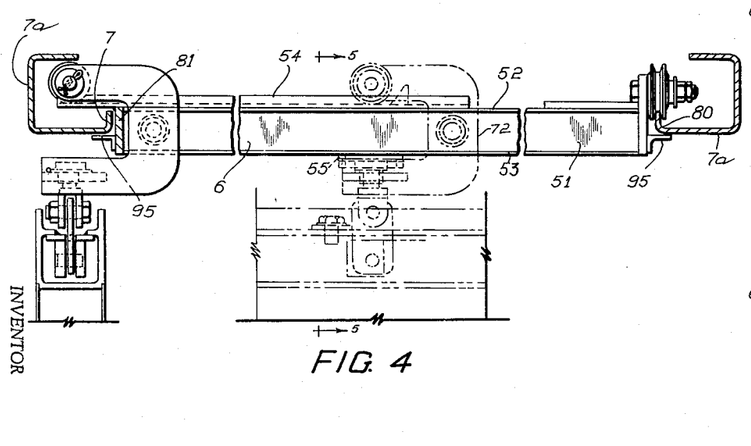
FIG. 4 is a side elevation of the traveling crane or beam.

In the disclosure of FIGS. 3, 4 and 5, the separator hanger or trolley is formed of C-shaped side plates 58 and 59 with the removable cross pin 60 for mounting the roller 61 on the track section 54. The cross brace 62 connecting the C-shaped side plates 58 and 59 below the trackage is formed with the bushed opening 63 through which the depending pin 64 extends, this pin 64 having a bifurcated lower extremity 65 through which a bolt 66 extends. The bolt 66 supports at its intermediate portion between the bifurcated extremity 65, a hanger 67 which is connected by a pin 68 to the adjusting blocks 69 positioned under the cross brace 70 between the U-shaped channel 71 forming the top structural member of a door, to be more fully hereinafter described. The C-shaped spaced plates 58 and 59 at their base portions 72, adjacent the medial portion of the I-beam, have bearing supports 73 and 74 which mount balls 75 and 76 which project inwardly and engage the side faces of the I-beam 51 of the transverse track or crane structure to prevent lateral movement and displacement of the hanger assembly and to retain the door in vertical suspension directly beneath the mounting roller 61.

In the disclosures previously described, it will be noted that the transverse beam or trackway forming the longitudinally traveling crane is so located that its outer end projects within the side rail, or more specifically between the track of the side rail and the side wall of the car, and this structure and arrangement, together with the novel structure of the C-shaped traveling separator hanger results in the positioning of the separator when in its side or parked position directly against the side wall of the car with the load of the separator directly suspended beneath the mounting rollers of the separator hanger. This concept is more clearly disclosed in FIGS. 3 and 4, in which the extremity of the transverse track is shown projecting well within the side rail 7a and inwardly beyond the trolley rail or supporting flange 7.

The transverse beams or cranes 6 which travel on the longitudinally extending tracks, either at each side of the car where a single door is used, or at one side of the car and at the center of the car structure where two doors are used, include carriage structures at each end, which carriage structures have their wheels mounted on the upturned inner flanges or tracks 7 of the longitudinally extending trackways 7a. The carriage structures are generally of elongated form to provide for appropriate spacing of the supporting rollers. In FIGS. 3 and 4 the trolley at the outer end of the crane comprises an elongated plate 81 fixed at the end of the I-beam of the crane, the elongated plate 81 being somewhat offset at its terminal portions 82 and 83 to position the rollers 84 and 85 so that their flanges will be aligned with the upturned rail flange 7 of the side track assembly 7a. The flanged rollers 84 and 85 are removably mounted on bearings so that they can be readily replaced or have their bearing assemblies replaced or lubricated. The wheel and bearing assembly is held to the crane structure by bolt fastening 86.

The trolley at the inner (right) end of FIG. 3 will be offset laterally from the main portion of the crane, as shown, so that one of the trolley wheels 90 will be positioned generally at the end of the crane body, while the other will be substantially offset as at 91. In this disclosure, the trolley mounting plate 92 is shown as of greater vertical height to properly position the trolley structure 91 and 92 with respect to the rail flange 80. Likewise an angle brace 93 is provided for holding the trolley rigid with respect to the crane structure. The ends of the crane are provided with projecting flanges or angle plates 95 which extend beneath the longitudinal rails to prevent any vertical shifting of the crane assemblies which might cause displacement of the trolley wheels from their trackways.

Figure 11:
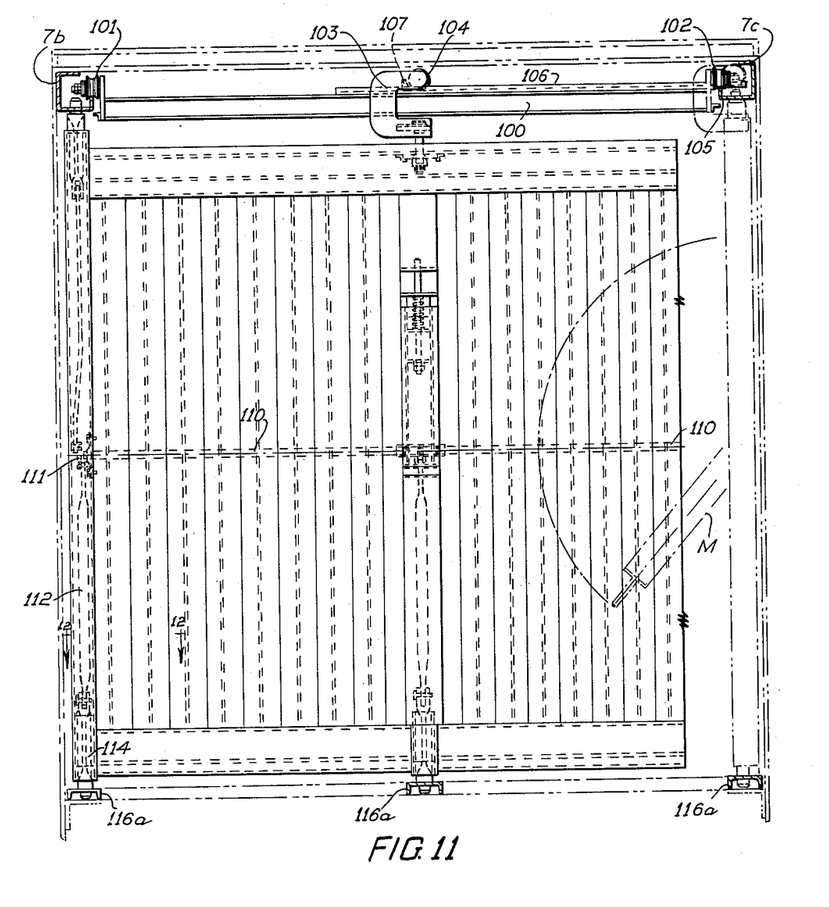
FIG. 11 is a transverse section through a railway car showing a separator assembly in elevation, the separator being of single form to extend the full width of the car.

In FIG. 11 of the drawings there is illustrated an assembly embodying the use of a single door or partition.

In this disclosure there is, of course, no center trackway, as the separator or partition extends from side wall to side wall of the railway car or other vehicle and is mounted centrally by a single hanger supported on a transversely extending rail or traveling crane 100 which has carriage assemblies 101 and 102 fixed at each end and mounted on the side rail or trackways 7b and 7c at each side wall of the car. The door hanger suspends the door from a point medially of its length by the C-shaped hanger 103 which is of the type and construction shown in FIGS. 6 and 7. As shown in FIGS. 3 and 4, the transversely extending beam or crane 100 has one terminal projecting within the side rail 7c so that the roller 104 of the C-shaped door hanger can move within the body of the side rail 7c and beyond the side rail track 105. Due to the C-shaped structure of the hanger 103, as previously described, and due to the suspension of the door by its pivot directly below the vertical plane of the roller 104, the door when moved against the side wall of the car will be suspended flush against the side wall of the car and directly beneath roller 104.

As previously explained, the structure of hanger 103 and the association of the transverse beam or crane 100 with respect to the side rail 7c provides a direct vertical loading of the door on the hanger 103 and avoids the prior practice of mounting the door offset from the crane structure on an extended arm beyond the supporting roller which creates an angular loading on the arm mount. The establishment of the pendulum mount of the door assembly directly through the vertical longitudinal plane of the axis of the supporting roller 104 of the door hanger insures a proper positioning of the door with relation to its associated parts and particularly those parts including the pinning and locking of the door in its lading separator position or in its side wall or parked position, as will be more fully hereinafter described.

As shown in FIG. 11, the traveling cross beam or crane 100 is provided with the top track portion 106 which corresponds to the trackway previously shown and described and accommodates the roller 104 of the traveling hanger 103 which supports the door. The trackway or rail 106 terminates beyond the medial point of the crane 100 and includes a stop member 107, as in the previous structure, it being understood that the travel of the hanger 103 is necessarily limited to generally one-half of the transverse dimension of the separator and thus the use of the track portion 106 on the I-beam of the crane assembly is only required for the area of travel of the roller 104.

Figures 13, 14, 15, 17:
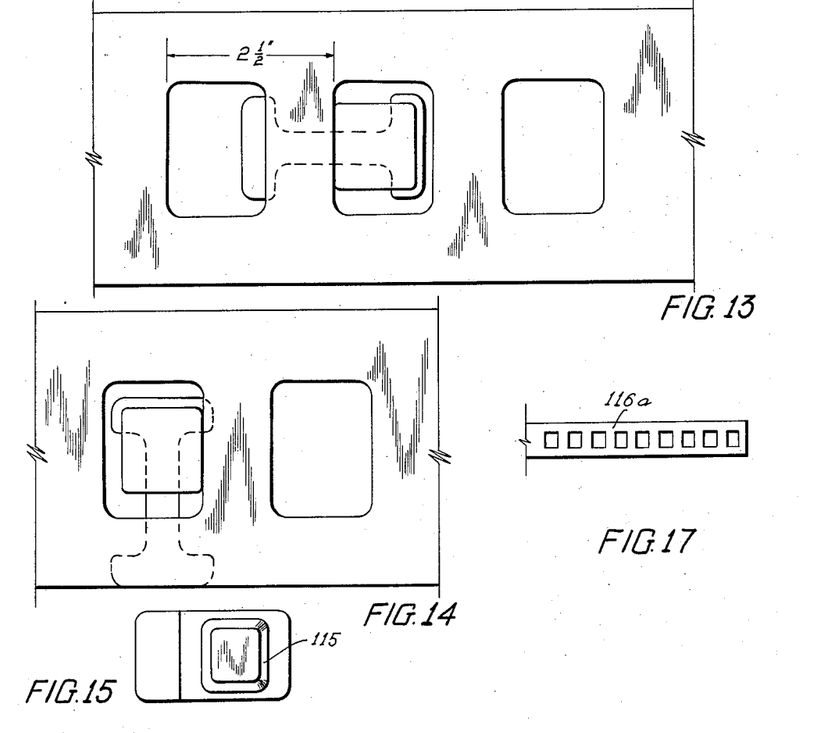
FIG. 13 is a fragmentary plan view showing a lock member in section and in door closed and locked position.
FIG. 14 is a view, similar to FIG. 13, showing the door in open and locked position.
FIG. 15 is an end view of a locking pin.
FIG. 17 shows a fragmentary plan view of a section of door track.
Figure 16:
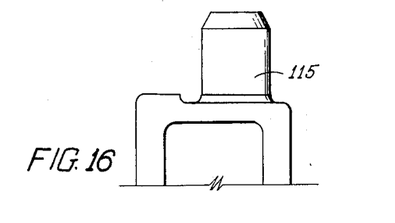
FIG. 16 is a side elevation of the lock pin of FIG. 15.

The door locking mechanism, insofar as the leverage is concerned, is generally conventional to the extent that lock bars containing pins are driven into position to engage lock rails by the manipulation of a single lever M in FIG. 11. Such actuating mechanism is generally selective and includes, as shown in FIG. 11, an actuating bar 110 operating through levers 111 a plurality of links 112 to hinged lock bars 114. The lock bars 114 are provided, as shown in FIGS. 15 and 16, with a single offset pin 115. The offset pin 115 cooperates with suitably arranged holes in lock strips 116a shown in FIGS. 1, 11 and 17, these lock strips being fixed to the floor of the car as shown in FIGS. 1 and 11. The upper lock bars extend into holes or perforations formed in the bottom wall of the side rails 7 or 7a, in accordance with the forms of the invention shown in FIG. 1 or FIG. 11. The specific arrangement and spacing of the holes or perforations shown is for the purpose of illustration and it will be obvious to one skilled in the art that if necessary or convenient, these dimensions may be altered in order to satisfy conditions where requirments are such as to be more restricted as to close association of the door or partition body with respect to the lading. As an illustration, the single point offset design in FIGS. 13 and 14 with an associated lock strip at the floor and ceiling could have one row of holes on 2½″ centers. In this connection it will be noted that the point is offset ⅝″ from the center line of the locking bar which also is the center line of the door. This structure will then provide an adjustment of 2½″ minus 2×⅝″ or 1¼″ when the door is turned 180°.

Due to the structure of the locking bars and pins, shoulders are provided which will pick up the weight of the door and support the door weight on the locking bar when the doors are in either their transverse lading retaining position or in their side wall or parked position.

Figure 2:
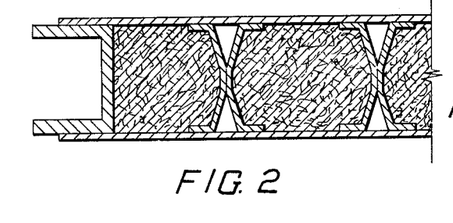
FIG. 2 is a fragmentary transverse section on line 2—2 of FIG. 1.
Figure 12:
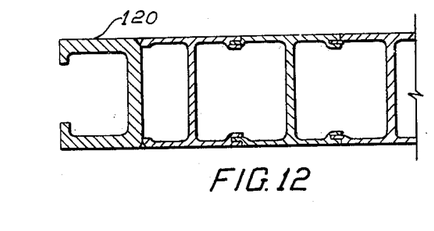
FIG. 12 is a fragmentary section on line 12—12 of FIG. 11.

In FIGS. 11 and 12 a separator structure is illustrated where the assembly is fabricated from extrusions of light weight material such as aluminum. The structure disclosed is a concept for obtaining maximum strength and rigidity by using special forms of sections in the form of associated channels in which the vertical end beams are relatively heavy extrusions, as shown at 120. In the door structure shown in FIGS. 1 and 2, the assembly is designed for the use of high strength steel and the cavities of the fabricated parts are adapted to be filled with some light weight material for added rigidity and strength at low cost.

Figure 9:
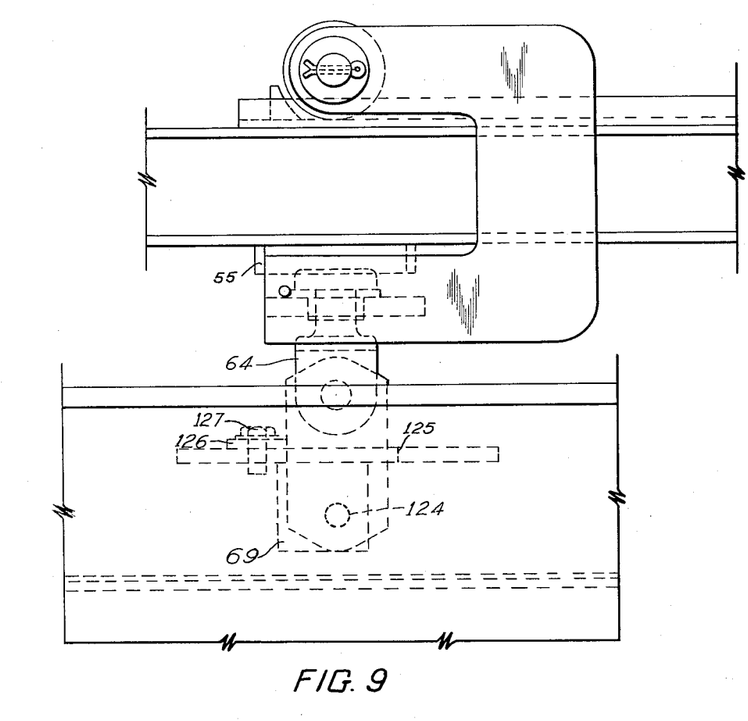
FIG. 9 is a fragmentary elevation of a modified form of hanger showing adjustment means for supporting the separator.
Figure 10:
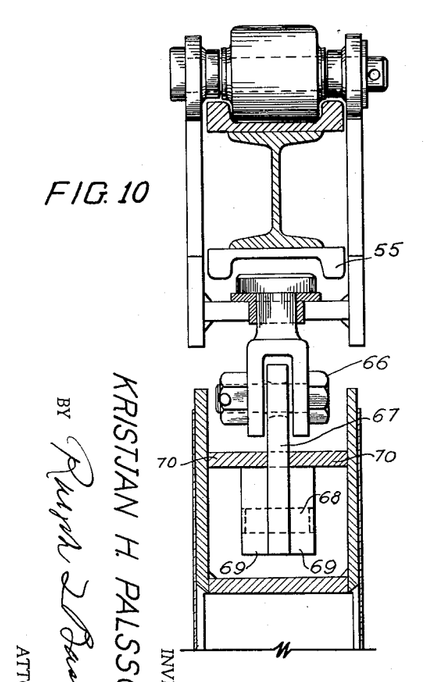
FIG. 10 is an end elevation, partly in section, of the disclosure of FIG. 9.
Figure 18:
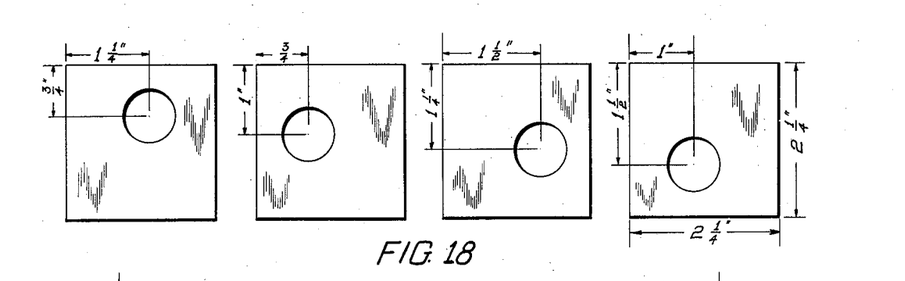
FIG. 18 illustrates in plan a series of adjusting blocks for the door hanger shown in FIGS. 5 and 10.

In FIG. 9 the connection between the depending separator support and the separator comprises a pair of adjusting blocks 69, these blocks having a pair of aligned openings 124, which openings are both vertically and laterally positioned, as shown in FIG. 18, to receive a pin 68 which extends through the bottom of the link 67 connected with the depending pin 64. The openings 124 are located in the blocks 69 so that the distance from the openings to the edges varies by a certain selected dimensional factor, such as for example ¼″. In this instance, the blocks are made 2¼″ square and the openings located so that the distance from one edge is ¾″, from the second edge 1″, from the third edge 1¼″ and from the fourth 1½″. To adjust the separator vertically in relation to the vehicle dimension, a pair of blocks 69 with the proper edge distance are selected and placed against plates 70 and connected to the hanger by means of pin 68, and connecting link 67. To position the link 67 and the blocks 69 attached thereto between the fixed plates 70 projecting from each side of the inner face of the door frame member, it is only necessary to slide the link 67 along a medial slotway formed centrally of plate 70 and terminating at 125. When the link 67 is appropriately positioned and connected with the door, the slot can be closed by a transverse plate 126 and a pair of suitably arranged bolts 127 extending through the plate 70 at each side of the slot.

It will be noted that the rail at the bottom of the I-beam includes the channelway 55 which is provided to prevent undesirable lateral movement of the C-shaped side walls of the hangers. The channelway 55 may be fixed at a single point, i.e. the central point of the door support or may be extended for the length of the traveling distance of the C-shaped hanger so that regardless of the position of the hanger, this channelway 55 will be in position to abut the side walls of the hanger to retain same against undesirable side movement.

Basically the concept comprehends the projection of a crane extremity to a point substantially towards the adjacent side wall of a car and inward towards the side wall of the car from the trackway 7. In association with this projection of the crane extremity, the C-shaped form of the separator hanger is a cooperating part in that it permits the travel of the supporting roller 61 well within the area between the track 7 and the side wall of the car and simultaneously positions the separator directly therebeneath or immediately adjacent the side wall, as shown in FIG. 4. This association of the parts is obtained by the novel form of C-shaped hanger, the arms of which are directed towards the track and the side walls of which embrace the side walls of the traveling beam or crane. By this arrangement the entire assembly is stabilized, the load is directly applied to the hanger equipment, and the hanger itself is retained with its arms extending lengthwise of its own crane. The side walls of the hanger and the bearings projecting inwardly from the side walls, as shown in FIG. 5, not only prevent undesirable transverse displacement, but likewise prevent any tendency of the hanger assembly to rotate under any and all conditions.

The concept also comprehends a finer adjustment of the separator structure in relation to the lading. This novel feature is obtained by offsetting the locking means in relation to the center of the door structure, thus obtaining a shorter longitudinal take-up, when the door is turned 180°, than the take-up provided by the hole spacing alone.

What I claim is:

1. In a railway car assembly having spaced side walls, a floor and a roof, longitudinally extending side rail members fixed to the side walls of the car adjacent the roof, said side rails including longitudinally extending tracks, said tracks being spaced inwardly from said side walls, a transversely extending beam including an upwardly facing trackway mounted upon the tracks of said side rail members for travel therealong, the trackway of said transversely extending beam extending over the track of one of the longitudinally extending side rail members to a position between said track and the adjacent side wall, a partition member adapted to be supported from said transverse beam, and means for supporting said partition member on said transverse beam including a traveling hanger, said traveling hanger being of C-form with the arms of the C-shaped hanger extending toward one side wall and positioned one above and one below the transversely extending beam, said C-shaped hanger including a pair of side walls positioned at each side of the rail, roller means mounted at the free end of the upper arm of said C-shaped hanger member for travel on its upwardly facing trackway, a vertically positioned pin suspended from the outer portion of the lower arm of the C-shaped hanger member, said pin having its axis in alignment with the medial portion of said superimposed roller means, and means on the pin for rotatably supporting said partition, whereby said C-shaped hanger when moved along the trackway of said transversely extending beam may travel on said trackway outwardly beyond the track of the side rail member and suspend the partition member between the longitudinally extending track and the adjacent side wall of the car when the partition member is rotated on its supporting pin to a position parallel to the car side.

2. The structure of claim 1 characterized in that means are provided for vertically adjusting the partition on the depending pin.

3. The structure of claim 1 characterized in that the pin includes an adjustable spherical member which seats in an arcuate supporting element to facilitate the adjustment and rotation of the door on the pin.

4. The structure of claim 1 characterized in that the pin includes an adjustable spherical member which seats in an arcuate supporting element carried by the partition to facilitate the adjustment and rotation of the door on the pin.

5. The structure of claim 1 characterized in that the roller means mounted at the free end portion of the upper arm is removable to permit removal or reversal of the hanger.

6. The structure of claim 1 characterized in that the depending pin is mounted in a vertical bearing located centrally of a plate connecting the inner faces of the side walls of the lower arm.

7. The structure of claim 1 characterized in that the central axis of the pin is vertically aligned with and lies in a vertical plane extending through the axis of the roller means at the free end portion of the upper arm.

8. In a railway car assembly having spaced side walls, a floor and a roof, longitudinally extending side rail members fixed to the side walls of the car adjacent the roof, said side rails including longitudinally extending tracks, said tracks being spaced inwardly from said side walls, a pair of laterally spaced track members extending longitudinally of said car substantially centrally of its width, a pair of transversely extending beams each including an upwardly facing trackway, each of said beams having its outer end portion mounted upon a track of one of said side rail members and its inner end mounted upon one of the medially positioned longitudinally extending track members, whereby said beams may travel along their tracks longitudinally of said car, the trackways of each of said transversely extending beams projecting outwardly over the track of one of the longitudinally extending side rail members to a position between its track and the adjacent side of the side wall, a pair of partition members adapted to be supported by said transverse beam members, and means for supporting each of said partition members on one of said transverse beams, including a traveling hanger, said traveling hanger being of C-form with the arms of the C-shaped hanger extending towards one side wall and in the direction of the length of its beam, the upper arm of said travelling hanger being positioned above its beam and the other arm of said hanger being positioned below the beam, said C-shaped hangers each including a pair of side walls positioned at each side of its rail, roller means mounted at the free end portion of the upper arm of said C-shaped hanger for travel upon the upwardly facing trackway of the beam, a depending pin supported at the outer portion of the lower arm of the C-shaped hanger, said pin having its vertical axis intersecting the medial portion of said roller means, and means for rotatably supporting a partition on the lower portion of said pin, whereby said C-shaped hanger when moved along the trackway of its beam may travel on its trackway outwardly beyond the track of the side rail member and suspend its partition member at a position in an upright plane projecting between the longitudinally extending track and the adjacent side wall of the car when its partition member is rotated on its supporting pin to a position parallel to the car side.

9. The structure of claim 8 characterized in that means are provided for vertically adjusting the partition on the depending pin.

10. The structure of claim 8 characterized in that the pin includes an adjustable spherical member which seats in an arcuate supporting element to facilitate the adjustment and rotation of the door on the pin.

11. The structure of claim 8 characterized in that the pin includes an adjustable spherical member which seats in an arcuate supporting element carried by the partition to facilitate the adjustment and rotation of the door on the pin.

12. The structure of claim 8 characterized in that the roller means mounted at the free end portion of the upper arm is removable to permit removal or reversal of the hanger.

13. The structure of claim 8 characterized in that the depending pin is mounted in a vertical bearing located centrally of a plate connecting the inner faces of the side walls of the lower arm.

14. The structure of claim 8 characterized in that the central axis of the pin is vertically aligned with and lies in a vertical plane extending through the axis of the roller means at the free end portion of the upper arm.

15. A vehicle body having spaced side walls, a floor and a roof, longitudinally extending side rail assemblies arranged in said vehicle body, said side rail assemblies including longitudinally extending trackways, one of the longitudinally extending side rail assemblies being fixed to one side wall of the vehicle body adjacent the roof and having its trackway spaced inwardly from said side wall, a transverse beam having carriage supports at each end for travel along said trackways, said transverse beam including a trackway, said trackway extending along the transverse beam and over the trackway of the side rail assembly fixed to the side wall of the vehicle body and to a position between the trackway of the side rail assembly fixed to the vehicle body and the adjacent side wall, a partition member, hanger means for supporting the partition member on said transverse beam for travel therealong and rotation from a position transverse of the vehicle body to a position parallel to a side wall of the vehicle body, said hanger means being of C-form with its upper arm positioned above the trackway of said transverse beam and the other arm below said transverse beam, both of said arms of said hanger projecting in the direction of the beam and toward the side rail spaced from the side wall of the vehicle body, roller means for mounting the outer free end portion of the upper arm of the C-shaped hanger on the trackway of said transverse beam, and means depending from the outer portion of the lower arm for supporting said partition member.

16. The structure of claim 15 characterized in that the medial portion of the C-form hanger means is provided with inwardly projecting guide members for engaging the transverse beam.

17. The structure of claim 15 characterized in that the transverse beam includes an offset extremity.

18. The structure of claim 15 characterized in that swivel means are provided for connecting the partition member and the depending means.

19. The structure of claim 15 characterized in that the C-shaped hanger means has its legs sufficiently spaced to straddle the carriage support at the end of the transverse beam when the partition member is rotated to a position parallel to a side wall of the vehicle body and adjacent thereto.

20. The structure of claim 15 characterized in that the depending member is adjustably associated with the outer end portion of the C-form hanger.

References Cited in the file of this patent

UNITED STATES PATENTS

| | | |
|---|---|---|
| 2,327,265 | Herr | Aug. 17, 1943 |
| 2,333,600 | Trautvetter | Nov. 2, 1943 |
| 2,834,304 | Chapman et al. | May 13, 1958 |
| 3,017,843 | Loomis et al. | Jan. 23, 1962 |
| 3,063,388 | Margarian et al. | Nov. 13, 1962 |